Dec. 20, 1960  H. G. JENKINS ET AL  2,965,778
LOW PRESSURE ELECTRIC DISCHARGE LAMPS
Filed May 15, 1958
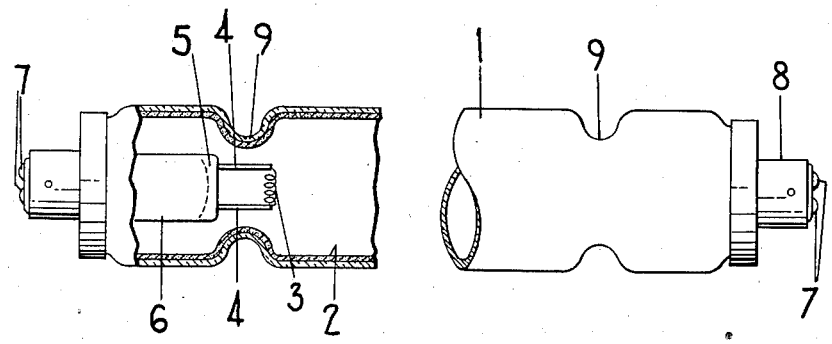
INVENTORS
HENRY GRAINGER JENKINS
CHARLES EDINGTON WILLIAMS
BY
ATTORNEYS

United States Patent Office 2,965,778
Patented Dec. 20, 1960

---

2,965,778
LOW PRESSURE ELECTRIC DISCHARGE LAMPS

Henry Grainger Jenkins, Pinner, and Charles Edington Williams, Stanmore, England, assignors to The General Electric Company Limited, London, England Filed May 15, 1958, Ser. No. 735,559

Claims priority, application Great Britain May 21, 1957

8 Claims. (Cl. 313—33)

This invention relates to low pressure mercury vapour fluorescent electric discharge lamps of the type having an elongated tubular discharge envelope which contains mercury, is provided with a heatable electrode at each end, is coated on its inner surface with a layer of fluorescent material which is excitable to fluorescence by the ultraviolet radiations produced when an electric discharge takes place through the mercury vapour filling in operation of the lamp, and which includes also a quantity of rare gas at a few millimetres pressure for facilitating the starting of the lamp.

It is known that lamps of the type specified operate with the maximum efficiency at a particular relatively low vapour pressure, and with fluorescent lamps as they are usually made at present this fact limits the wattage which can usefully be dissipated in the lamp since the increased wattage results in a higher vapour pressure and the efficiency rapidly falls off to an undesirably low value.

For reducing this limitation it has been proposed to provide behind at least one of the electrodes a shield which is carried by the electrode supports and extends across the greater part of the envelope cross-section and serves to restrict the transfer of heat from the space between the electrodes into the space between the shield and the adjacent end of the lamp, thereby providing a relatively cool region at the end of the lamp envelope. In use of the lamp the presence of such a shield is mainly effective in reducing the transfer of heat to the adjacent end of the envelope by reducing the effect of convection currents, and since the vapour pressure is determined by the temperature of the coolest part of the envelope, the rate of increase of vapour pressure with wattage dissipated in the lamp is reduced and the lamp can be operated at relatively high wattages with greater efficiency than would be possible in the absence of the shields.

The object of the present invention is to provide an alternative construction in which the effect of such a shield is achieved in a different way that may be more advantageous in at least some cases.

According to the invention in a lamp of the type specified the area of cross-section of the discharge envelope at one end at least is reduced by the inward deformation of the envelope wall over a region between the electrode at that end and the adjacent end of the envelope so as to provide a constricted region of the envelope behind the electrode which restricts the transfer of heat by convection from the space between the electrodes to the space between the constriction and the adjacent end of the envelope when the lamp is in use, whereby at least part of the envelope at said end is maintained, in use of the lamp, at a temperature lower than any part of the envelope between the electrodes.

The actual temperature at which the end of the envelope is maintained will be dependent on the nature of the constriction employed but by the use of a constriction of suitable shape and dimensions the vapour pressure within the discharge envelope when the lamp is in use can be maintained, even at relatively high wattage dissipations, at a value which is much nearer to the optimum so as to maintain a good efficiency of the lamp.

The transfer of heat to the end of the envelope may in general be satisfactorily restricted by reducing the cross-sectional area of the interior of its envelope in the constricted region to about one third of that of the part of the envelope between the lamp electrodes.

The constriction may be formed by squeezing the heat-softened glass of the envelope in the appropriate region between a pair of opposed jaws to provide a flattened region of reduced area of cross-section. Alternatively an annular inwardly-directed depression may be formed in the wall of the envelope to provide a constriction of waisted form.

In a lamp having this latter form of constriction, and whose discharge envelope had an internal diameter of about 1.4 inches, an appreciable reduction in the vapour pressure was obtained by making the minimum diameter of the restricted region about 0.7 inch.

Preferably the discharge envelope is provided with a constriction behind each of the two electrodes to provide relatively cool regions at both ends of the envelope.

In order to enable a lamp of given length in accordance with the invention to operate with a high wattage dissipation without excessively increasing the current density, the use of a rare gas filling of neon, or a mixture of neon and argon, has been found preferable to the use of argon alone, which is commonly employed in known lamps of the type specified, owing to the higher voltage drop along the positive column when neon is employed.

One lamp in accordance with the invention will now be described by way of example, with reference to the accompanying drawing which shows a side view of the lamp with the central part broken away and with the envelope wall at one end cut away to show the envelope in section in the region of one electrode.

The lamp is provided with a straight tubular discharge envelope 1 five feet in length and with an external diameter of about 1½ inches. The inner surface of the envelope is coated with a suitable fluorescent material 2. At each end of the lamp a heatable electrode 3 is mounted near to the end of the envelope, and leads 4 to the electrode extend outwards through the pinch 5 of a foot-tube 6 in the usual way, the outer ends of the leads being connected to the terminals 7 of a bayonet-type lamp cap 8 secured to the end of the envelope by a suitable cement.

The envelope 1 contains a filling of mercury for providing for a mercury vapour discharge between the lamp electrodes when the lamp is in use, together with a rare gas filling consisting approximately of 80% neon and 20% argon at a total pressure of 2 millimetres mercury, the percentages being in respect of the partial pressures of the gases compared with their total pressure.

The electrode leads 4 and the pinched foot-tubes 6 are of such a length that the distance of each electrode 3 from the adjacent end of the discharge envelope 1 is about 2 inches, and just to the rear of each electrode the bore of the envelope is constricted by the formation of an annular depression 9 in the envelope wall.

The depth of each depression 9 is approximately 0.3 inch and has the effect of reducing the cross-sectional area of the interior of the envelope in the region where it is formed to about one third of that of the part of the envelope between the lamp electrodes; we have found that by constricting the envelope in this manner the transfer of heat from the space between the electrodes to the spaces between the constrictions and the adjacent ends of the envelope is considerably reduced.

The depressions are conveniently formed in the wall of the discharge envelope subsequent to the sealing in of foot-tubes, by heating the envelope in the required regions to soften the glass, whilst the envelope is rotated about its axis, and pushing in the softened glass by means of a suitable shaping tool by the desired amount.

In a modification of the lamp described an increased proportion of argon, that is to say about 40% of the mixture, may be included within the rare gas filling, the total pressure remaining at 2 millimetres mercury. This has the effect of slightly reducing the inherent efficiency obtainable, but in general this is compensated for by an increased lamp life.

We claim:

1. A low pressure mercury vapour fluorescent electric discharge lamp having an elongated tubular transparent discharge envelope which contains mercury, is provided at each end with an electrode which is heated to incandescence when the lamp is in use, is coated on its inner surface with a layer of fluorescent material which is excitable to fluorescence by the ultra-violet radiations produced when an electric discharge takes place through the mercury vapour filling in operation of the lamp, and which includes also a quantity of rare gas at a few millimetres pressure for facilitating the starting of the lamp, wherein the area of cross-section of the envelope at one end at least is reduced by the inward deformation of the envelope wall over a region between the electrode at that end and the adjacent end of the envelope so as to provide behind the electrode a constricted region of the envelope lying between parts of the envelope having the full area of cross-section and having itself an area of cross-section which is significantly less than that of the main part of the envelope between the electrodes and between the constriction and the adjacent end of the envelope, said constriction restricting the transfer of heat by convection from the space between the electrodes to the space between the constriction and the adjacent end of the envelope when the lamp is in use for maintaining said end at a lower temperature than that of any part of the envelope between the electrodes.

2. A low pressure mercury vapour fluorescent electric discharge lamp according to claim 1 wherein the cross-sectional area of the interior of the envelope in the constricted region is about one third of that of the part of the envelope between the electrodes.

3. A low pressure mercury vapour fluorescent electric discharge lamp according to claim 1 wherein the constricted region of the envelope is provided by an annular inwardly-directed depression in the wall of the envelope.

4. A low pressure mercury vapour fluorescent electric discharge lamp according to claim 1 wherein the discharge envelope is provided with a said constricted region behind each of the two electrodes whereby at least part of the envelope at each end is maintained, in use of the lamp, at a lower temperature than any part of the envelope between the electrodes.

5. A low pressure mercury vapour fluorescent electric discharge lamp according to claim 1 wherein the rare gas filling consists substantially wholly of neon.

6. A low pressure mercury vapour fluorescent electric discharge lamp according to claim 1 wherein the rare gas filling consists of a mixture of neon and argon.

7. A low pressure mercury vapour fluorescent electric discharge lamp according to claim 6 wherein the rare gas filling consists approximately of 80% neon, and 20% argon at a total pressure of 2 millimetres mercury, the percentages being in respect of the partial pressures.

8. A low pressure mercury vapour fluorescent electric discharge lamp according to claim 6 wherein the rare gas filling consists of approximately 60% neon and 40% argon at a total pressure of 2 millimetres mercury, the percentages being in respect of the partial pressures.

References Cited in the file of this patent

UNITED STATES PATENTS

| | | |
|---|---|---|
| 2,116,429 | Gooskens | May 3, 1938 |
| 2,164,183 | Van Liempt | June 27, 1939 |
| 2,249,610 | James | July 15, 1941 |
| 2,249,672 | Spanner | July 15, 1941 |
| 2,433,218 | Herzog | Dec. 23, 1947 |
| 2,433,404 | Smith | Dec. 30, 1947 |